Nov. 9, 1937.  L. G. NAKICH  2,098,304
SWIVEL CONNECTER
Filed Sept. 23, 1935
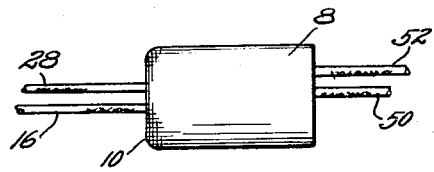
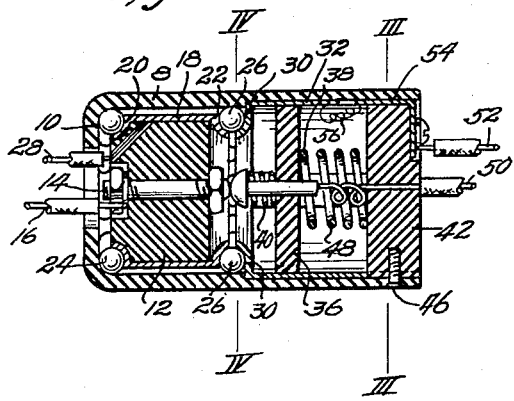
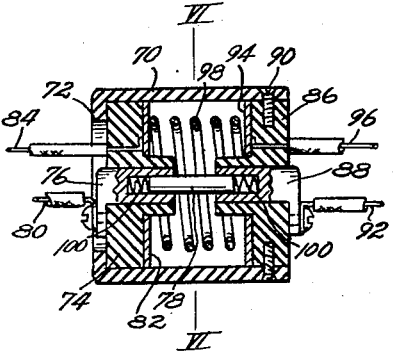
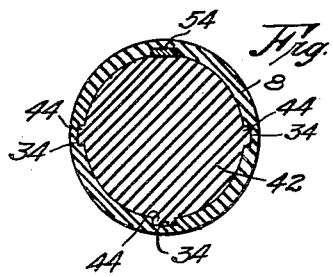
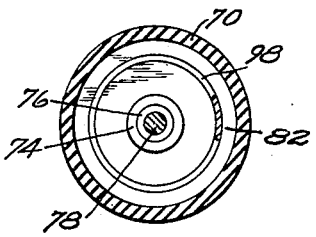
INVENTOR,
Louis G. Nakich.
BY
ATTORNEYS.

Patented Nov. 9, 1937

2,098,304

UNITED STATES PATENT OFFICE 2,098,304

SWIVEL CONNECTER

Louis G. Nakich, Kansas City, Mo.

Application September 23, 1935, Serial No. 41,687

1 Claim. (Cl. 173—324)

This invention relates to electrical connecters of a type which will permit relative rotation of different sections of electrical extensions or cords when the same are joined together by the novel swivel connecter embodying this invention.

The primary object of this invention is to provide a swivel connecter which will assist in precluding objectionable twisting of electrical cords and one of the important aims is to provide unique and novel structure that is simple, efficient in operation, durable and unlikely to break the electrical contact even after long and constant usage.

Minor objects of the invention, including the specific manner of making the swivel connecter contemplated by this invention will appear during the course of the following specification, referring to the accompanying drawing, wherein two embodiments of the invention are illustrated, and wherein:

Fig. 1 is a side elevation of a swivel connecter made in accordance with this invention.

Fig. 2 is an enlarged, longitudinal, central section through a swivel connecter made to embody the preferred form of the invention.

Fig. 3 is a cross section through the connecter, taken on line III—III of Fig. 2.

Fig. 4 is another cross section, taken on line IV—IV of Fig. 2.

Fig. 5 is another longitudinal, central section through an electrical connecter which embodies another form of the invention, and Fig. 6 is a cross section through the said connecter, taken on line VI—VI of Fig. 5.

Referring particularly to the illustrated embodiment of the invention shown in Figs. 1 to 4 inclusive, the numeral 8 designates a case of non-conducting material, which is substantially cylindrical in form and partially closed at one end by the inturned, annular portion 10 thereof. This case 8, which may be made of any suitable non-conducting material, houses a unitary assembly which is movable about the longitudinal, central axis of case 8. This unitary assembly comprises a body of non-conducting material 12, having a pin 14 extending therethrough, which should be of metal or other suitable material which will conduct current. A wire 16 is attached to pin 14 as illustrated in Fig. 2 and body 12 has a metallic collar 18 circumscribing the same which is fashioned to form ball races 20 and 22 respectively.

The ball race is at one end of body 12 and the ball bearings 24 which ride in said race bear against case 8 to contribute in holding the unitary assembly in spaced relation thereto. Balls 26 which ride in ball race 22 serve as electrical conductors and a wire 28 is in connection with collar 18 so as to complete the hereinafter described circuit.

A ball race 30 is formed of metal and is in opposed relation with respect to race 22. This race 30 has a series of fingers 32 extending therefrom which are positioned in the longitudinally extending grooves 34 formed along the inner face of case 8. These fingers 32 are secured to a disc 36 by pins or small screws, not here shown, and disc 36 has a central opening to receive contact pin 38 which is in frictional engagement with pin 14. Disc 36 and fingers 32 cannot rotate because the fingers are in grooves 34.

A relatively light spring 40 positioned between the head of pin 38 and disc 36 urges pin 38 against pin 14. A plug 42 having radially extending tongues 44 to engage grooves 34 is secured in case 8 by screws or analogous means 46 and a comparatively heavy spring 48 is interposed between discs 36 and plug 42 for the purpose of holding the parts in assembled relation and especially race 30 against balls 26. A wire 50 is in connection with pin 38 and a wire 52 is in connection with strip 54, which in turn, is joined to one of fingers 32 through the medium of wire 56. Thus it is obvious that the unitary structure suspended by the ball bearings may freely turn while current is passing from wire 16 through pin 14, contact pin 38 and wire 50 to an appliance or other point of use.

From this point of use the return circuit may be traced as follows: Wire 52, strip 54, wire 56, finger 32, ball race 30, ball bearings 26, ball race 22, collar 18, wire 28.

In the modified form of the invention illustrated in Figs. 5 and 6, the swivel connecter is of the same general character, but specifically different. There are some common elements, but the movable unit is not ball bearing. In this form, the case 70 is of non-conducting material with an inturned, annular flange 72 at one end. Body 74 has a central bore which receives the metallic member 76 which has a socket formed therein for the reception of one end of contact pin 78. This member 76 is joined by wire 80 and a metallic washer or plate 82, joined by wire 84, is carried by body 74. This body 74 is of non-conducting material and is free to turn about the longitudinal central axis of case 70, upon which axis pin 78 is disposed.

A rigid plug 86 of non-conducting material, having a central bore to receive a metallic member 88, is secured in case 70 by screws 90 and a socket formed in member 88 receives the other end of pin 78. A wire 92 is in connection with member 88 and the plate or similar member 94 is joined by wire 96 which extends through plug 86. A spring 98 is interposed between plates 82 and 94 and light springs 100 are positioned between the ends of pins 78 and the bottoms of the sockets formed in members 76 and 88. The circuit through this form of swivel connecter may be traced through the parts numbered as follows: 80, 76, 100, 78, 100, 88, 92, and then back through 96, 94, 98, 70 and 84.

While two specific forms of the swivel connecter have been illustrated and described it is obvious that many changes and modifications might be employed without departing from the spirit of the invention or scope of the appended claim.

Having thus described the invention, what is claimed as new and desired to be secured by Letters Patent is:

A swivel connecter of the character described comprising a case of non-conducting material; an assembly movable as a unit about an axis within the case having a body of non-conducting material, an axially extending pin of conducting material therethrough, a ball race formed of conducting material at each end of the body, and wires in connection with the said pin and ball race; another ball race formed of conducting material in opposed relation with the innermost ball race of the movable assembly; balls of conducting material in said opposed races; a wire in connection with said last mentioned ball race; a contact pin of conducting material having a wire in connection therewith in frictional engagement with the first mentioned pin; a spring to urge the contact pin toward the said first mentioned pin; a holder of non-conducting material for said contact pin and associated spring; and another spring yieldably securing said holder in place with the pins in frictional engagement.

LOUIS G. NAKICH.